United States Patent

Luciano

[11] Patent Number: 5,226,988
[45] Date of Patent: Jul. 13, 1993

[54] TIRE HAVING AN OFFSET MULTILAYER BELT BAND

[75] Inventor: Sergio Luciano, Rome, Italy

[73] Assignee: Pirelli Coordinamento Pneumatici S.p.A., Milan, Italy

[21] Appl. No.: 707,884

[22] Filed: Jun. 3, 1991

[30] Foreign Application Priority Data

Jun. 1, 1990 [IT] Italy ................................ 20506 A/90

[51] Int. Cl.[5] ................................................ B60C 9/18
[52] U.S. Cl. .................................... 152/538; 152/526; 156/130
[58] Field of Search ............... 152/526, 531, 535, 538; 156/123, 124, 130, 133, 134, 177

[56] References Cited

U.S. PATENT DOCUMENTS

| | | |
|---|---|---|
| 2,984,282 | 5/1961 | Vittorelli ................... 152/535 |
| 3,608,605 | 9/1971 | Cole . |
| 3,756,883 | 9/1973 | Gay . |
| 3,898,116 | 8/1975 | Katagiri et al. .............. 156/134 |
| 3,972,767 | 8/1976 | Frazier . |
| 4,135,565 | 1/1979 | van der Berg ............. 152/535 X |
| 4,325,423 | 4/1982 | Seitz et al. . |
| 4,531,561 | 7/1985 | Ippen et al. .............. 156/134 X |
| 4,815,514 | 3/1989 | Hara et al. . |

FOREIGN PATENT DOCUMENTS 61373 9/1970 Luxembourg .
1457040 12/1976 United Kingdom .

Primary Examiner—Geoffrey L. Knable
Attorney, Agent, or Firm—Stevens, Davis, Miller & Mosher

[57] ABSTRACT

A process for applying a belt structure during the manufacture of a large heavy duty tire such as for an earthmover machine including forming a belt band 5 obtained by adhering together two rubberized fabric strips 8, 9 so as to be laterally offset with respect to each other. Each strip has reinforcing cords 8a, 9a disposed according to symmetrically cross-biased orientations. A belt band made of at least two adhered together strips is wrapped on the carcass 2 of a tire being manufactured with one or more complete turns around the radial outer circumferential surface of the carcass. The end edges 5a, 5b of the belt band 5 are cut perpendicularly to the longitudinal axis thereof and are disposed to overlap each other with the amount of overlap ranging between 20 and 80 mm. In a tire manufactured in accordance with the above process, the belt band 5 wrapped around the carcass 2 in one or more complete turns, has its respective rubberized fabric strips 8, 9 radially superposed in several layers and mutually axially offset in an alternating sequence.

5 Claims, 1 Drawing Sheet

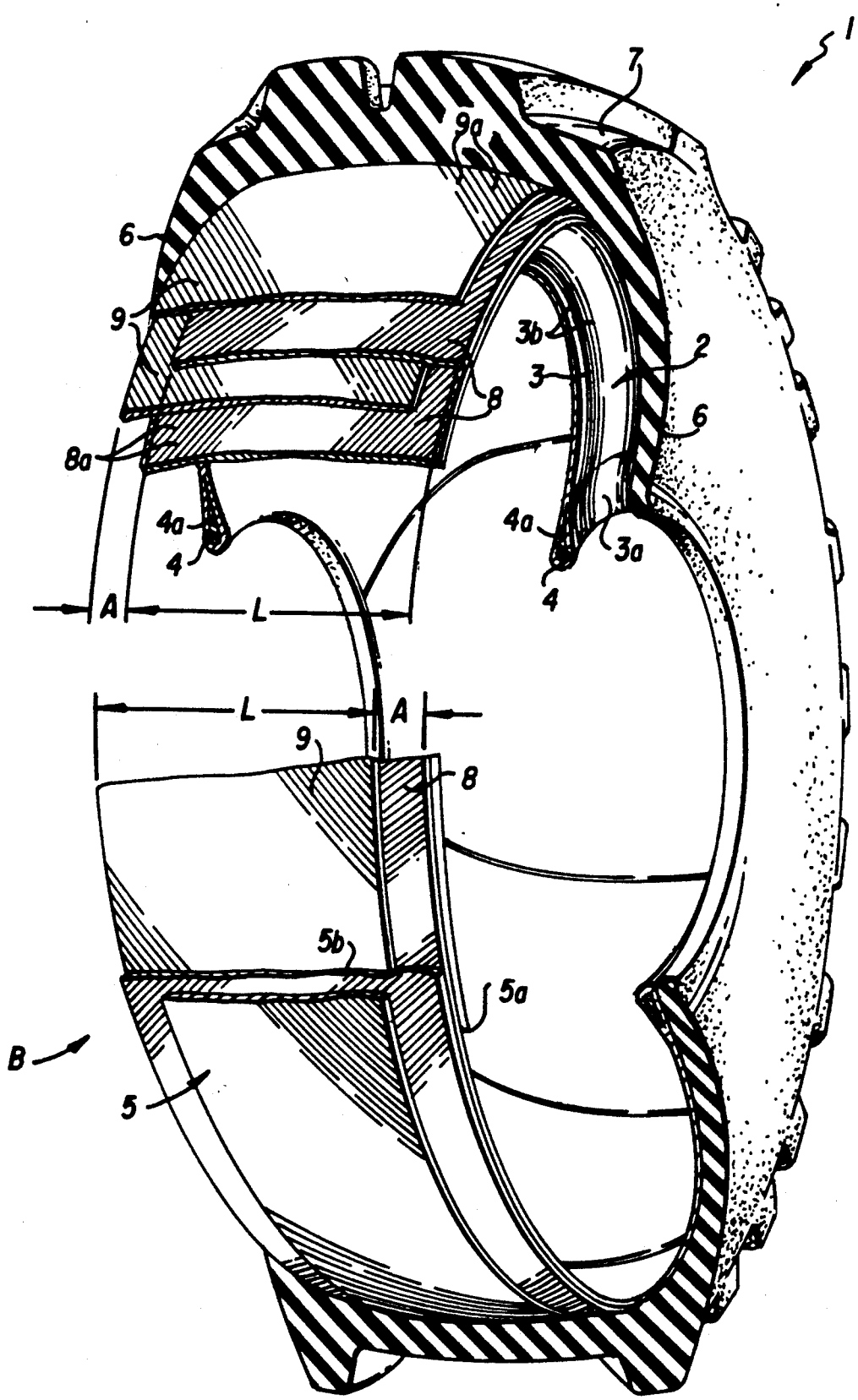

TIRE HAVING AN OFFSET MULTILAYER BELT BAND

BACKGROUND OF THE INVENTION

The present invention relates to a process for applying a belt structure to the carcass of a radial tire under construction, as well as to the tire obtained by that process. This tire is of the type comprising: a substantially toroidal carcass, a belt applied to the radial outer circumferential surface of the carcass; two sidewalls made of elastomeric material applied to the respective axial opposite sides of the carcass; and a tread band applied to the radial outer circumferential surface of the carcass over the belt and joining the radial outer edges of the sidewalls.

In greater detail, the concerned process is adapted to be used in making tires for heavy motor vehicles such as, for example, earthmoving machines, farm tractors and the like.

Radial tires are being increasingly adapted for uses of the above type. In this type of tires the ply or plies employed in the carcass manufacture have their respective reinforcing cords disposed in planes containing the axis of rotation of the tire.

In order to give the carcass the necessary stiffness in the radial direction of the tire (perpendicular to the axis of rotation) as well as desirable features as regards to roadholding, the application of a so-called belt structure is made along the radial outer circumferential surface of the carcass and at a substantially middle position relative to the equatorial plane of the tire.

This belt structure substantially consists of a plurality of radially superposed strips made of rubberized fabric, each of them having a plurality of parallel reinforcing cords disposed alongside one another according to an orientation slightly inclined to the equatorial plane of the tire and cross-biased, preferably at an equal and opposite angle, to the reinforcing cords of the overlying and/or underlying strip.

THE PRIOR ART

Presently, for the application of a belt to the carcass, single strips of rubberized fabric are wrapped, one at a time, about the radial outer circumferential surface of the carcass so as to form one complete turn. At the end of the wrapping of each individual rubberized fabric strip, the opposite ends thereof are provided to be joined together by a mutual slight overlapping, after cutting those ends across the lengthwide direction of the reinforcing cords.

In addition the end junctions of the individual rubberized fabric strips must be positioned at different circumferential locations around the circumferential outer surface of the carcass. This expedient, which has been hitherto universally adopted in the field, is intended to cause a homogeneous distribution of the different junctions on the circumference of the carcass when the tire is completed, for the purpose of a static and dynamic balancing of the tire.

In addition, in order to decrease the degree of discontinuity created by the radially overlapped and coincident edges of the individual strips which gives rise to structural unevenness and possible undesired separations of the belt structure edges from the carcass, without at the same time reducing the belt sturdiness even in the critical area thereof, that is at said edges, the rubberized fabric strips are disposed laterally offset with respect to one another by groups of two. In other words, the first two strips of rubberized fabric applied to the carcass are exactly in superposed relation with respect to each other and are laterally offset relative to the two strips applied next.

As can be seen from the foregoing description, it is apparent that the methods presently adopted for the manufacture of the belt involve an important use of man-power and long working times.

This is due first of all to the fact that the strips forming the belt, owing to the orientation in the opposite ways of the cords in the adjacent strips, must be applied one at a time, and the end cutting and joining operations need to be repeated at each application. In this connection it is to be noted that, when tires for the above specified uses are to be made, the individual cutting and joining operations are made difficult by the fact that, owing to the important width of the rubberized fabric strips and the reduced inclination angle (on the order of 30°) of the cords relative to the equatorial tire plane, the end edges along which said cutting and joining operations must be carried out are important considerations.

Also the large diameter of the tires being made leads to a considerable circumferential distance around the carcass making it difficult to execute accurate junctions and since a plurality of junctions are needed, there is a plurality of problems in making them.

SUMMARY OF THE INVENTION

The object of the present invention is substantially to solve the problems of the known art by a process which permits the application of the belt structure to be carried out in a very quick and easy manner, while at the same time also improving the operating features of the resulting tire.

The foregoing and further objects, that will become more apparent in the course of the following description are substantially attained by a process for applying a belt structure to the carcass of a tire being made comprising the following steps: adhering together the flat surfaces of at least two elongate strips of rubberized fabric, each such strip being rectangular in cross section with upper and lower flat surfaces and longitudinally extending straight edges along each side and having respective reinforcing cords oriented according to an angle of 20° to 30° relative to the longitudinal axis of the strip. This forms a belt band in which the cords of said strips are oriented in a cross-biased manner, preferably symmetrically, that is with the cords of one strip extending at equal and opposite angles to the cords of the contiguous strip. The rubberized fabric strips are preferably laterally (axially) offset with respect to one another. The end edges of the belt band are cut in a direction substantially perpendicular to the longitudinal axis of the strip so as to give the desired length to said band; wrapping the belt band on the carcass by at least one turn around the radial outer circumferential surface thereof and at a substantially centered position with respect to the equatorial plane of the tire being made; overlapping the end edges of the belt band on each other.

The tire produced by the above process is characterized in that its belt structure consists of at least one complete turn of the belt band, comprising at least two rubberized fabric strips adhered together with each other preferably at laterally (axially) offset positions, each of which has the respective reinforcing cords oriented parallelly at an angle of 15° to 27° relative to the equatorial plane of the tire and cross-biased relative to the reinforcing cords of the other strip, the end edges of said band being cut in a direction substantially parallel to the tire axis.

BRIEF DESCRIPTION OF THE DRAWING

Further features and advantages will become more apparent from the detailed description of a preferred embodiment of a process of applying a belt structure to a carcass of a tire being made, and the tire obtained by thereby, the present disclosure being given hereinafter by way of non-limiting example with reference to the accompanying drawings, in which:

the sole FIGURE is a perspective view partially cut away with the cut surfaces being designated by cross hatching.

DETAILED DESCRIPTION OF THE INVENTION

Tire 1, of the radial type, conventionally comprises a carcass 2 formed with at least a carcass ply 3 the radial inner ends 3a of which are folded back around at least a pair of bead cores 4. The fold is from the axial inner to the axial outer side of the bead core and each such core is provided with an elastomer filler 4a on the radial outer periphery thereof.

The carcass ply 3 has a plurality of parallel reinforcing cords 3b each lying in a plane containing the axis of rotation of the tire. Applied to the crown of carcass 2, at a substantially centered position relative to the equatorial or mid circumferential plane of tire 1, is a belt structure B having the task of giving an appropriate stiffness to the carcass in the radial direction, that is, in the direction perpendicular to the axis of rotation.

Further in a known manner and therefore described only briefly, tire 1 further comprises two sidewalls 6 of elastomeric material applied to the opposite axial sides of the carcass 2 and a tread band 7 applied to the radial outer circumferential surface of carcass 2, over the belt structure, and joined to the radial outer edges of the sidewalls 6. On a finished tire the tread band 7 and sidewalls 6, as well as the elastomeric material present in a known manner in the carcass 2 and the belt structure B, substantially form a unitary body after vulcanization.

In accordance with the present invention, the application of the belt to the carcass 2 is carried out according to a process first providing the mutual adhering together of the surfaces of at least two elongated flat strips of rubberized fabric 8, 9 preferably having the same width "L" and axially offset from each other by an appropriate axial distance "A", so as to form a belt "band" 5; preferably the distance A is in the range of 5 mm to 20 mm. Since the strips are not yet vulcanized, they have a sticky surface and can be readily adhered together without the need for any additional adhesive.

Each of the rubberized fabric strips 8, 9 is essentially comprised of a plurality of mutually parallel reinforcing cords 8a or 9a, of any appropriate textile or metallic material, preferably a textile material, rayon, nylon, aramide (Kevlar, a trademark, available from DuPont, in its best-known embodiment) or polyester fibers for example, which are disposed in side by side relation and preferably embedded in a layer of elastomeric material initially in a raw state. Preferably, when textile materials are used the reinforcing cords 8a or 9a of each strip 8, 9 are distributed in a density in the range of 70 to 120 cords per linear decimeter as measured across the width of a strip.

The cords 8a, 9a of each strip 8, 9 are oriented at to an angle of 20° to 30° with respect to the longitudinal axis of the strip, so as to give rise to an inclination, measured on the vulcanized tire at the equatorial plane, of 15° to 27°, preferably 18° to 24°, relative to said plane.

In addition, the cords 8a, 9a in the rubberized fabric strips 8, 9 are disposed according to cross-biased orientations, preferably symmetrically, as clearly shown in the figure; that is, the cords of strip 8 will intersect the equatorial plane at an angle that is equal and opposite to the angle of the cords of strip 9.

The previous coupling of the rubberized fabric strips 8, 9 can be achieved in any convenient manner, for example by making the strips pass between two opposite rollers compressing them against each other so as to cause the mutual adhesion of the same due to the elastomeric material present therein.

The belt band 5 thus obtained is subsequently wrapped onto the carcass with at least one turn about the outer surface thereof and at a substantially centered position relative to the equatorial plane of the tire under construction.

Together with the wrapping step, another step is provided which consists of cutting the belt band to the desired length. In an original manner this step is carried out by cutting the end edges 5a, 5b of the belt band 5 in a direction greatly angled to the lying direction of the cords and in particular substantially at right angles to the longitudinal axis of said band, that is with a symmetric tolerance of 30° (+/− 15°) with respect to a strictly perpendicular direction (90°).

In keeping with one aspect of the process of the invention, the cutting to size of the belt band 5 is carried out before the execution of the wrapping step.

Alternatively, if the belt band is continuously fed onto the carcass 2 during the wrapping, one end edge 5a is cut before the wrapping step, whereas the second end edge 5b will be cut when the wrapping is over. It will be recognized that simultaneously with the cutting of the second end edge 5b, also the cutting of the first end edge belonging to the belt band to be applied next to a subsequent tire (to be later manufactured) will be obtained.

Preferably, as clearly seen from FIG. 1, the wrapping of the belt band 5 entails at least two turns around the outer surface of carcass 2, so that the rubberized fabric strips 8, 9 are disposed in a multi-layered overlapping relation and laterally (axially) offset in alternating sequence.

At the end of the application of the belt band 5, the end edges 5a, 5b thereof are mutually overlapped and said overlapping preferably extends over a portion of 20 mm to 80 mm.

When the belt band application has been completed, the tire manufacture goes on in a known and conventional manner, that is the sidewalls 6 and tread band 7 are applied and then the vulcanization step occurs.

It is to be noted that the width "L" of the rubberized fabric strips 8, 9 the amount "A" of the side staggering of the same, and the number of turns according to which the belt band 5 is wrapped around the carcass 2 are selected each time depending upon the type and size of the tire to be made. In the connection a Table is reproduced hereinafter in which, by way of example only, the above specified construction parameters relating to some radial tires produced by the Applicant are shown.

TABLE

|      | W      | Dc    | Dm      | L      | A     | n |
|------|--------|-------|---------|--------|-------|---|
| Ex. 1 | 14.9"  | 24"   | 1058 mm | 290 mm | 10 mm | 2 |
| Ex. 2 | 16.9"  | 34"   | 1364 mm | 360 mm | 10 mm | 2 |
| Ex. 3 | 18.4"  | 38"   | 1507 mm | 390 mm | 12 mm | 3 |

In the above Table, columns denoted by "W", "Dc" and "Dm" respectively refer to the maximum cord width expressed in inches, the keying diameter expressed in inches and the maximum diameter, expressed in millimeters, of the tire carcass at the beginning of the belt laying step. Column "n" indicates the number of turns according to which the belt band 5 is wrapped about the carcass 2. Columns L and A have already been discussed previously.

It has been found that, independently of the construction parameters of the manufactured tire, the application of the belt band 5 according to the process of the invention enables an important time saving. More particularly, it is noted that the application of the belt band 5 of the invention requires a time that is about four to six times less than in the known art.

This is due to the fact that the application of several superposed layers of rubberized fabric strips 8, 9 is carried out in a single step involving the wrapping around the carcass and the end cutting and joining. In addition, said cutting and joining operations are also facilitated by the fact that the cutting takes place almost perpendicularly to the longitudinal extension of the belt band 5.

It has also been found that the tires made in accordance with the invention do not exhibit a reduction of their performances as compared with the tires of the known art. On the contrary, different laboratory tests carried out by the assignee have proved that the tires of the invention possess improved qualities as regards their lifetime and/or fatigue limit.

In greater detail, three tires produced in accordance with Example 1 of the above Table have been submitted to a conventional fatigue test, of the indoor type.

Assuming the average lifetime of conventional tires to be equal to 100, all size and structural features being equal as well as the test conditions, the tires of the invention have proved an average lifetime 7% longer than those of the known art. Said indoor fatigue test has been carried out by rotating the tire, inflated to a pressure of 1.1 bar (the rated pressure in use is 1.6 bar), against the surface of a roller of a diameter of 1700 mm, rotating to a periphery speed of 30 km/h, the tire being pressed against said roller by exerting a force of 1675 kg (the service load of the tire is established to 1700 kg).

The inflation pressure, load and test speed have been selected so as to constitute an overload for the tire structure included between 50% and 100% of the service load.

Four tires corresponding to Example 2 in the above Table having a service load equal to 2430 kg and a rated pressure of 1.6 bar, were submitted to an indoor fatigue test of the discussed type, at a pressure of 1.1 bar and a load of 2395 kg respectively, have shown an average lifetime equal to 116, as usual considering the average lifetime of conventional tires to be equal to 100.

Two tires still corresponding to Example 2 in the above Table have been also submitted to an outdoor fatigue test, in which they have shown an average lifetime of 131, still considering the average lifetime of conventional tires equal to 100.

Outdoor testing has been carried out by mounting the tires on a vehicle running to a speed of 17 km/h. The tires, inflated to the rated service pressure of 1.6 bar, have been also mounted so as to have a camber angle of 16° and have been submitted to a load exceeding the maximum service load by 10%.

In this case too the camber angle is selected so as to virtually increase the tire overload until values included between 50% and 100% of the rated load.

It has also been detected that the geometrical eccentricity of the tires of the invention is substantially equal to the eccentricity that can be found in tires which are produced following the conventional technique providing the distribution of the different end junctions of the strips along the periphery of the carcass.

The possible (on the other hand not ascertained) slight dynamic unbalancing due to the presence of the overlap of ends 5a, 5b localized at a single point on the circumferential extension of the carcass 2, is of little importance since the tires of the concerned type are always used at low operating speeds, generally not higher than 50 km/h.

The present invention attains the intended purposes.

Obviously modifications and variations can be made to the invention as indicated by the attached claims.

I claim:

1. A tire for heavy motor-vehicles comprising:
    a substantially toroidal carcass;
    a belt structure applied to the radial outer circumferential surface of the carcass;
    two sidewalls of elastomeric material applied to the respective axial opposite sides of the carcass;
    a tread band applied to the radial outer circumferential surface of the carcass over said belt structure, and joining the radial outer edges of the sidewalls, said belt structure comprising at least one complete turn of a belt band, said band comprising at least two rubberized fabric strips adhered to each other with each strip being axially offset by a distance in the range of 5 mm to 20 mm with respect to the other strip, each of said strips having a plurality of parallel reinforcing cords oriented at an angle of 15° to 27° with respect to the equatorial plane of the tire, the cords of one strip intersecting the equatorial plane of the tire of an acute angle that is equal and opposite to the angle of the cords of the adjacent strip, the end edges of said belt band being cut in a direction substantially parallel to the tire axis and said end edges overlapping one over the other.

2. A tire according to claim 1, in which said belt band is wrapped in the carcass with at least two turns around the radial outer surface of the carcass.

3. A tire according to claim 1, in which the overlap of the end edges of the belt band is in the range of 20 mm to 80 mm.

4. A tire according to claim 1, in which reinforcing cords of said rubberized fabric strips are cords of textile material.

5. A tire according to claim 4, in which in each of the rubberized fabric strips said reinforcing cords are distributed at a density in the range of 70 to 120 cords per linear decimeter across the width of the strip.

* * * * *